(12) United States Patent
Li et al.

(10) Patent No.: US 9,122,924 B2
(45) Date of Patent: Sep. 1, 2015

(54) OBJECT IDENTIFICATION

(75) Inventors: Cheng Jun Li, Beijing (CN); Henry Chen, Beijing (CN); Jian Geng Du, Beijing (CN)

(73) Assignee: Honeywell International Inc., Morristown, NJ (US)

( * ) Notice: Subject to any disclaimer, the term of this patent is extended or adjusted under 35 U.S.C. 154(b) by 163 days.

(21) Appl. No.: 13/994,824

(22) PCT Filed: Dec. 20, 2010

(86) PCT No.: PCT/CN2010/002086
§ 371 (c)(1),
(2), (4) Date: Aug. 19, 2013

(87) PCT Pub. No.: WO2012/083479
PCT Pub. Date: Jun. 28, 2012

(65) Prior Publication Data
US 2013/0322764 A1    Dec. 5, 2013

(51) Int. Cl.
*G06K 9/00* (2006.01)
*G06F 17/30* (2006.01)

(52) U.S. Cl.
CPC ........ *G06K 9/00577* (2013.01); *G06K 9/00476* (2013.01); *G06F 17/30259* (2013.01); *G06F 17/30271* (2013.01)

(58) Field of Classification Search
None
See application file for complete search history.

(56) References Cited

U.S. PATENT DOCUMENTS

2007/0116365 A1 *   5/2007   Kloer ........................... 382/190

OTHER PUBLICATIONS

Hsieh et al. "Automatic Interpretation of Cadasters by Image Analysis Techniques." IEEE International Conference on Image Processing, vol. 3, Nov. 13, 1994, pp. 202-206.*
Tanaka et al. "Development of a Map Vectorization Method Involving a Shape Reforming Process." Proceedings of the Second International Conference on Document Analysis and Recognition, Oct. 20, 1993, pp. 680-683.*
Gamba et al. "Raster to Vector in 2D Urban Data." Urban Remote Sensing Joint Event, Apr. 11, 2007, pp. 1-6.*

* cited by examiner

*Primary Examiner* — Jon Chang
(74) *Attorney, Agent, or Firm* — Brooks, Cameron & Huebsch, PLLC

(57) ABSTRACT

Methods, devices, and systems for object identification are described herein. One or more method embodiments include converting data associated with an object on a geographical image or map into a number of primitives, fitting the number of primitives to a geometrical shape, and identifying the object based, at least in part, on the geometrical shape to which the number of primitives is fitted.

19 Claims, 3 Drawing Sheets

OBJECT IDENTIFICATION

TECHNICAL FIELD

The present disclosure relates to methods, devices, and systems for object identification.

BACKGROUND

Data mining can be used to collect and/or analyze data. Data mining can include, for example, the process of extracting patterns from data and/or transforming data into information. Data mining can be used in a number of applications, such as, for example, marketing, surveillance, fraud detection, and scientific discovery, among other applications.

One type of data mining is spatial (e.g., geographical) data mining. Geographical data mining can be used to find patterns in and/or identify objects in geography. For instance, geographical data mining can be used to find patterns in and/or identify objects contained in a geographical image or map, such as, for example, geographical objects, topological features, and spatial relationships contained in a geographical image or map, among other objects.

Previous geographical data mining approaches may use simple representations of objects contained in a geographical image or map to find patterns in and/or identify the objects. That is, previous geographical data mining approaches may be able to find patterns in and/or identify simple objects contained in a geographical image or map.

However, previous geographical data mining approaches may not use complex representations of objects contained in a geographical image or map to find patterns in and/or identify the objects. That is, previous geographical data mining approaches may not be able to find patterns in and/or identify complex objects contained in a geographical image or map. For example, previous geographical data mining approaches may not be able to identify complex geographical objects (e.g., geographical objects having lines and/or polylines) or complex spatial relationships (e.g., relationships having non-Euclidian distances, direction, connectivity, and/or interaction through attributed geographic space) contained in a geographical image or map.

DETAILED DESCRIPTION

Figure 1:
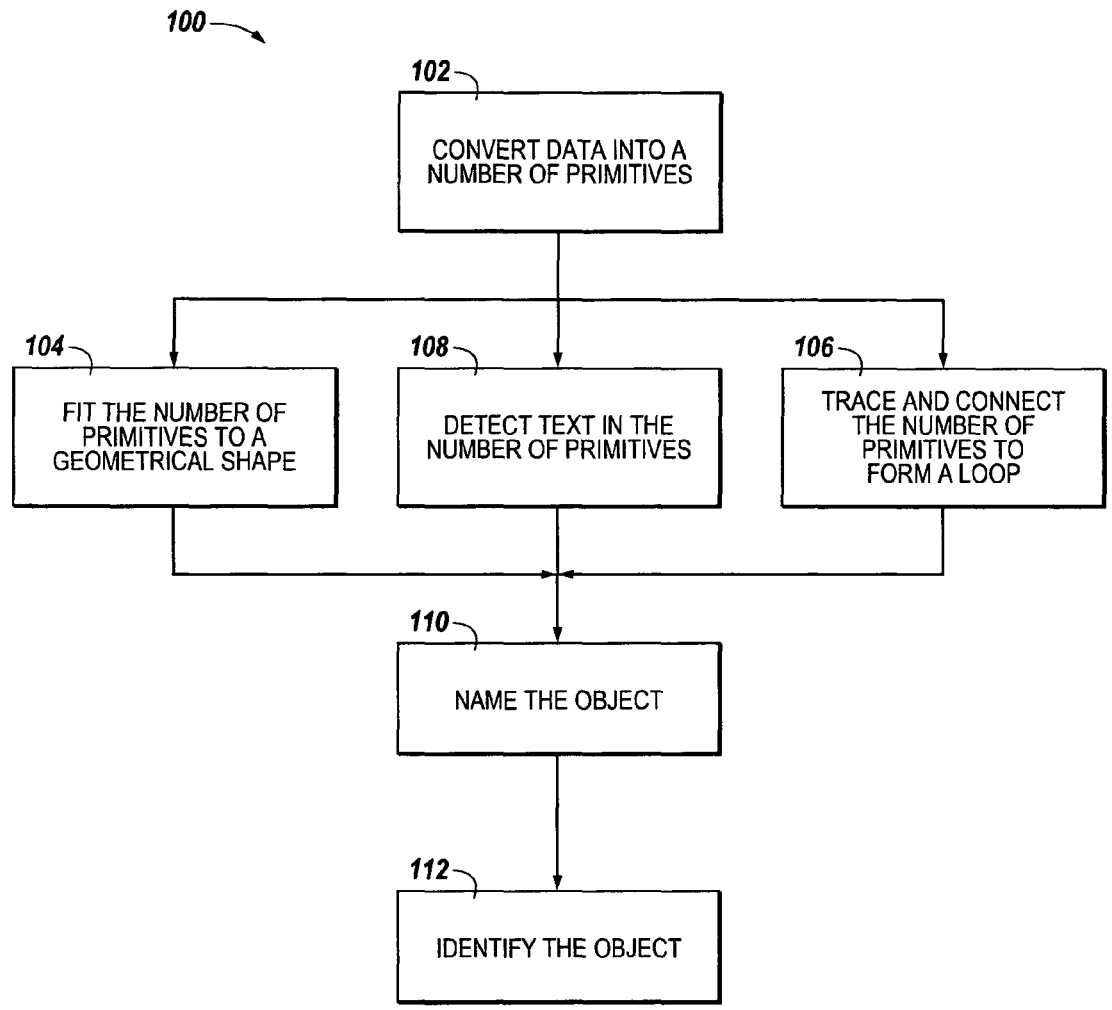
FIG. 1 is a flow chart illustrating a method for identifying an object in accordance with one or more embodiments of the present disclosure.

Methods, devices, and systems for object identification are described herein. One or more method embodiments include converting data associated with an object on a geographical image or map into a number of primitives, fitting the number of primitives to a geometrical shape, and identifying the object based, at least in part, on the geometrical shape to which the number of primitives is fitted.

One or more embodiments of the present disclosure can use complex representations of objects contained in a geographical image or map to find patterns in and/or identify the objects. That is, one or more embodiments of the present disclosure can find patterns in and/or identify complex objects contained in a geographical image or map. For example, one or more embodiments of the present disclosure can identify complex geographical objects (e.g., geographical objects having lines and/or polylines) and/or complex spatial relationships (e.g., relationships having non-Euclidian distances, direction, connectivity, and/or interaction through attributed geographic space) contained in a geographical image or map.

In the following detailed description, reference is made to the accompanying drawings that form a part hereof. The drawings show by way of illustration how one or more embodiments of the disclosure may be practiced. These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present invention, and should not be taken in a limiting sense.

As used herein, "a" or "a number of" something can refer to one or more such things. For example, "a number of primitives" can refer to one or more primitives.

FIG. 1 is a flow chart 100 illustrating a method for identifying an object in accordance with one or more embodiments of the present disclosure. The method can be performed by a computing device (e.g., computing device 340 described in connection with FIG. 3), as will be further described herein.

The object to be identified can be, for example, an object on a geographical image or map, e.g., a drawing and/or a geographical and/or architectural plan map. For instance, the object can be a building, a street or road, a body of water (e.g., a lake, river, or pond), a plant, a tank (e.g., a water or oil tank), a pipe, a duct, a wall, or a door, among other types of objects. However, embodiments of the present disclosure are not limited to a particular type of object.

At step 102, data associated with the object is converted into a number of primitives. The data associated with the object can be, for example, an image of the object on the geographical image or map. For instance, the data associated with the object can be an imported (e.g., loaded and/or processed) vector image, such as a DWG, DXF, and/or WMF image, or an imported bitmap (BMP) image, among other types of images. However, embodiments of the present disclosure are not limited to a particular type of image.

The image of the object on the geographical image or map can include a number of patterns. The number of patterns can include, for example, an arc for a door, two long parallel lines for a road, and/or a loop with long parallel lines for a pipe, among other patterns. However, embodiments of the present disclosure are not limited to a particular type of pattern.

The number of primitives to which the data associated with the object is converted can include, for example, a number of lines (e.g., a line segment having two end points), polylines (e.g., a series of connected lines wherein the last end point of the last line is not directly connected to the first end point of the first line), splines (e.g., a line, polyline, or curve defined by a series of control points and/or weights, such as, for example, a Bezier curve, a basis spline (B-spline), or a non-uniform rational B-spline (NURBS)), polygons (e.g., a series of connected points that form a loop), curves (e.g., open curves having a start point and an end point), ellipses (e.g., a round curve having a center, a major radius, and a minor radius), and/or arcs (e.g., a segment of an ellipse or circle) among other types of primitives. However, embodiments of the present disclosure are not limited to a particular type of primitive.

At step 104, the number of primitives are fitted to a geometrical shape. The geometrical shape to which the number of primitives are fitted can be, for example, an ellipse, a circle (e.g., an ellipse whose major and minor radii are the same), an arc, a rectangle (e.g., a four-point rectangular polygon), or a pipe-like geometrical shape (e.g., parallel lines having a short width), among other types of geometrical shapes. However, embodiments of the present disclosure are not limited to a particular type of geometrical shape.

As an example, a number of polylines in the number of primitives can be fitted to an ellipse. The major and minor radii of the ellipse can be determined using a bounding box associated with the polyline(s), and the axes of the ellipse can be aligned. Additionally and/or alternatively, a number of lines (e.g., twelve or more) in the number of primitives can be fitted to an ellipse.

As an additional example, a number of polylines in the number of primitives can be fitted to a rectangle. Additionally and/or alternatively, a number of lines (e.g., four) having perpendicular constraints in the number of primitives can be fitted to a rectangle.

As an additional example, a number of polylines in the number of primitives can be fitted to an arc. For instance, a number of polylines in the number of primitives can be fitted to an arc using the center point and two end points of the polyline(s).

At step 106, the number of primitives are traced and connected to form a loop. Step 106 can be performed in addition or alternatively to step 104, as illustrated in FIG. 1.

As an example, a number of open curves having a start point and an end point in the number of primitives can be traced and connected to form a loop. For instance, a number of lines, polylines, splines, and/or arcs in the number of primitives can be traced and connected to form a loop.

In some instances, multiple possible connections can exist between the number of primitives (e.g., between the start points and end points of the number of primitives). In such instances, the connection to be traced can be determined using directional tracing, right-most tracing, or left-most tracing. That is, in such instances, the number of primitives can be traced and connected using directional tracing, right-most tracing, or left-most tracing.

In directional tracing, the tracing attempts to preserve the previous tracing direction. That is, the connection to be traced is the connection that would preserve the previous tracing direction. In right-most tracing, the tracing proceeds in the right-most possible direction. That is, the connection to be traced is the connection that would result in the tracing proceeding in the right-most possible direction. In left-most tracing, the tracing proceeds in the left-most possible direction. That is, the connection to be traced is the connection that would result in the tracing proceeding in the left-most possible direction.

In some instances, a connection can be shared between multiple primitives (e.g., between multiple open curves). In such instances, each curve can be broken into two half curves with reverse directions. The half curves of each curve can be traced and connected (e.g., once) to form the loop, and any portions of the formed loop that overlap can be removed according to their direction (e.g., counter-clockwise or clockwise).

In some instances, the tracing may fail (e.g., a loop may not be formed) because the path being traced may end and can't be traversed back to its start point. That is, the number of primitives may be traced and connected in a first direction from a start point, but in some instances the path being traced may not traverse back to its start point to form a loop. In such instances, the number of primitives may be traced and connected in a second direction from the start point, wherein the second direction is a reverse direction from the first direction.

At step 108, text in the number of primitives is detected. Step 108 can be performed in addition or alternatively to steps 104 and/or 106, as illustrated in FIG. 1. Text in the number of primitives that can be detected can include, for example, names, acronyms, notes, dimensions, and/or numbers, among other types of text. However, embodiments of the present disclosure are not limited to a particular type of text.

As an example, text can be derived from a number of lines (e.g., line segments) and/or polylines in the number of primitives. For instance, endpoints of line segments in the number of primitives can be collected, a distance between pairs of the endpoints of the line segments can be determined, and any pair of endpoints having a distance therebetween that is less than a pre-defined text size can be connected. A bounding box associated with each connection can then be determined, and any connection having a bounding box associated therewith of a size that is outside a pre-defined bounding box size range can be removed. An image of the bounding boxes (e.g., the line segments and non-removed connections) can be sent to an optical character recognition (OCR) engine, and the OCR engine can perform an OCR operation on the image (e.g., on the line segments and non-removed connections) to detect (e.g., recognize) text in the image. The OCR engine can then output the detected text.

At step 110, the object is named, e.g., the name of the object is determined and/or correlated with the object. The object can be named, for example, using the detected text. Naming the object using the detected text will be further described herein, e.g., in connection with FIG. 2.

At step 112, the object is identified. The object can be identified based, at least in part, on the geometrical shape to which the number of primitives is fitted at step 104, the loop formed at step 106, the text detected in the number of primitives at step 108, and/or the name of the object determined at step 110.

As an example, the object can be identified by looking up the geometrical shape, the formed loop, the detected text, and/or the name of the object in a pre-defined library, such as, for example, an object definition library. The object definition library can include a number of object identifiers and definitions for each object identifier. The definition for each object identifier can include a description and/or examples of geometrical shapes, loops, text, and/or names corresponding to each object identifier.

For instance, an object identifier in the object definition library can be "building". The definition for "building" can include the description "a polygon whose edges are linear or perpendicular to connected edges, that is, all the corner angles are 90, 180, or 270 degrees", and examples of geometrical shapes and/or loops (e.g., polygons) meeting this description.

The definition for "building" can also include examples of text and/or names corresponding to a building, such as, for example, "office", "main office", "storage", "shop", "BLDG", etc.

An additional example of an object identifier in the object definition library can be "door". The definition for "door" can include the description "a circular arc of 45-90 degrees and a line segment connecting the center of the arc and one of its end points", and examples of geometrical shapes and/or loops (e.g., circular arcs) meeting this description. The definition for "door" can also include examples of text and/or names corresponding to a door.

An additional example of an object identifier in the object definition library can be "tank". The definition for "tank" can include the description "a circle with a particular radius length", and examples of geometrical shapes and/or loops (e.g., circles) meeting this description. The definition for "tank" can also include examples of text and/or names corresponding to a tank, such as, for example, "water", "oil", etc.

An additional example of an object identifier in the object definition library can be "pipe". The definition for "pipe" can include the description "parallel lines with short width", and examples of geometrical shapes and/or loops (e.g., lines) meeting this description. The definition for "pipe" can also include examples of text and/or names corresponding to pipe.

An additional example of an object identifier in the object definition library can be "street". The definition for "street" can include the description "parallel lines with longer width", and examples of geometrical shapes and/or loops (e.g., lines) meeting this description. The definition for "street" can also include examples of text and/or names corresponding to a street, such as, for example, "ST", etc.

Additional examples of object identifiers in the object definition library can be "water" and "plant". The definitions for "water" and "plant" can include examples of text and/or names corresponding to water, such as, for example, "pond", "sump", etc., and text and/or names corresponding to a plant, such as, for example, "cooling tower", etc., respectively.

Embodiments of the present disclosure are not limited to the object identifiers described herein. Additionally, embodiments of the present disclosure are not limited to the object identifier definitions described herein.

In embodiments in which the geometrical shape to which the number of primitives is fitted is a pipe-like geometrical shape (e.g., embodiments in which the object is identified as a pipe), additional analysis can be performed. For example, the number of primitives can be composed into a graph to unite independent primitives into a single geometry according to their location. The graph can include (e.g., can be defined by) a number of end points of the number of primitives and a number of edges between the number of endpoints. All end points of the number of primitives that are within a pre-defined tolerance distance can be merged into a single end point.

The graph can then be closed at the number of end points by adding an edge between any pair of end points that are open (e.g., have a valence in topology of 1) and adjacent (e.g., have a distance therebetween that is less than the pre-defined tolerance distance). Any open edges can then be removed.

The graph can then be partitioned into a number of segments by adding an edge between any pair of end points that are open and adjacent. The number of segments can then be located and refined by fitting the number of segments to a rectangle or chopped rectangle. The direction, length, and/or width of the pipe can be determined using a minimum bounding box algorithm, such as, for example, rotating calipers.

In one or more embodiments, after the object is identified, an image that includes the identified object can be generated. The generated image can also include multiple layers, wherein different layers include different types of objects, the original geographical image or map as a background, and/or data associated with the object in addition to the data converted to the number of primitives.

The generated image can be a two or three-dimensional image. For example, if the data associated with the object described in connection with step 102 was a two-dimensional image of the object, the height of the identified object can be projected to generate the three-dimensional image.

Figure 2:
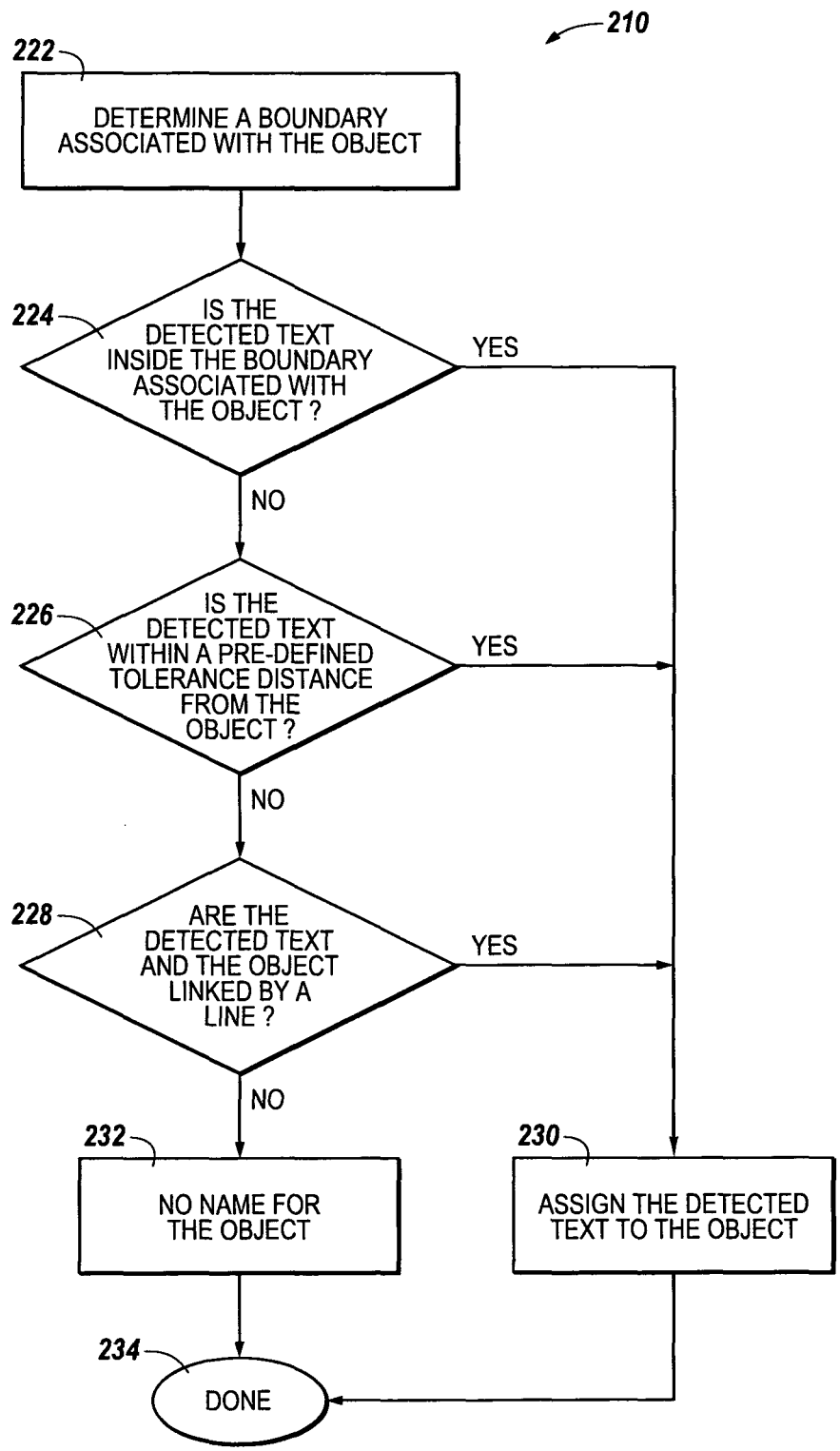
FIG. 2 is a flow chart illustrating a method for naming an object using detected text in accordance with one or more embodiments of the present disclosure.

FIG. 2 is a flow chart 210 illustrating a method for naming an object using detected text in accordance with one or more embodiments of the present disclosure. The method illustrated in flow chart 210 can be a part of step 110 previously described in connection with FIG. 1. The object can be the object (e.g., the object to be identified) previously described in connection with FIG. 1. The detected text can be the detected text previously described in connection with FIG. 1, e.g., in connection with step 108.

At step 222, a boundary associated with the object is determined. The boundary can be, for example, a boundary loop of the object.

At step 224, a determination of whether the detected text is inside the boundary associated with the object is made. If the detected text is inside the boundary associated with the object, the detected text is assigned to the object at step 230, and the method is concluded at step 234.

If the detected text is not inside the boundary associated with the object, a determination of whether the detected text is within a pre-defined tolerance distance from the object is made at step 226. That is, if the detected text is outside the boundary associated with the object, a determination of whether the detected text is adjacent and/or near the object and/or boundary associated with the object can be made.

If the detected text is within the pre-defined tolerance distance from the object, the detected text is assigned to the object at step 230, and the method is concluded at step 234. If the detected text is not within the pre-defined tolerance distance from the object (e.g., if the detected text is outside the pre-defined tolerance distance from the object), a determination of whether the detected text and the object are linked by a line is made at step 228. The line can be, for example, a curve pointing to the object and the detected text.

If the detected text and the object are linked by a line, the detected text is assigned to the object at step 230, and the method is concluded at step 234. If the detected text and the object are not linked by a line, no name exists for the object (as illustrated by step 232), and the method is concluded at step 234.

Figure 3:
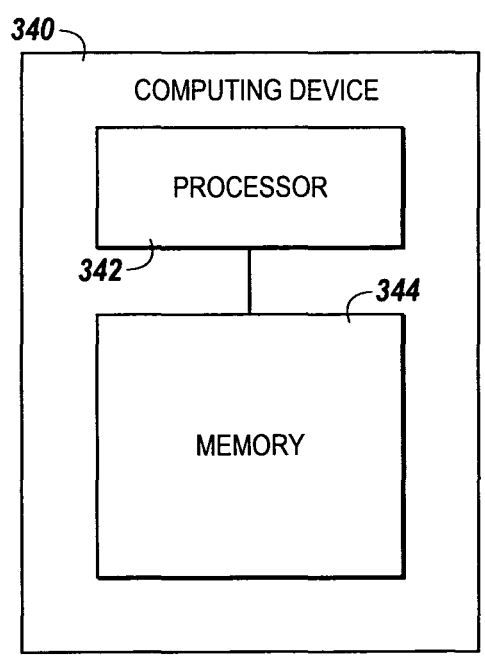
FIG. 3 illustrates a block diagram of a computing device for identifying an object in accordance with one or more embodiments of the present disclosure.

FIG. 3 illustrates a block diagram of a computing device 340 for identifying an object in accordance with one or more embodiments of the present disclosure. As shown in FIG. 3, computing device 340 includes a processor 342 and a memory 344 coupled to processor 342.

Memory 344 can be volatile or nonvolatile memory. Memory 344 can also be removable, e.g., portable memory, or non-removable, e.g., internal memory. For example, memory 344 can be random access memory (RAM), read-only memory (ROM), dynamic random access memory (DRAM), electrically erasable programmable read-only memory (EEPROM), flash memory, phase change random access memory (PCRAM), compact-disk read-only memory (CD-ROM), a laser disk, a digital versatile disk (DVD) or other optical disk storage, and/or a magnetic medium such as magnetic cassettes, tapes, or disks, among other types of memory.

Further, although memory 344 is illustrated as being located in computing device 340, embodiments of the present disclosure are not so limited. For example, memory 344 can also be located internal to another computing resource, e.g., enabling computer readable instructions to be downloaded over the Internet or another wired or wireless connection.

Memory 344 can store executable instructions, such as, for example, computer readable instructions (e.g., software), for identifying an object in accordance with one or more embodiments of the present disclosure. That is, memory 344 can store executable instructions for performing one or more of the methods for identifying an object previously described herein, e.g., for performing one or more of the steps previously described herein.

Processor 342 can execute the executable instructions stored in memory 344 to identify an object in accordance with one or more embodiments of the present disclosure. That is, processor 342 can execute the executable instructions stored in memory 344 to perform one or more methods for identifying an object previously described herein, e.g., to perform one or more of the steps previously described herein.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computer implemented method for identifying an object, comprising:
    converting data associated with an object on a geographical image or map into a number of primitives;
    fitting the number of primitives to a geometrical shape;
    tracing and connecting the number of primitives to form a loop;
    detecting text in the number of primitives; and
    identifying the object based, at least in part, on the geometrical shape to which the number of primitives is fitted, the formed loop, and the detected text.

2. The method of claim 1, wherein detecting text in the number of primitives includes deriving text from a number of line segments in the number of primitives.

3. The method of claim 2, wherein deriving text from the number of line segments in the number of primitives includes:
    determining a distance between pairs of endpoints of the number of line segments;
    connecting any pair of endpoints having a distance therebetween that is less than a pre-defined text size;
    determining a bounding box associated with each connection;
    removing any connection having a bounding box associated therewith of a size that is outside a pre-defined bounding box size range; and
    performing an optical character recognition operation on the number of line segments and non-removed connections.

4. The method of claim 1, wherein the method includes generating an image, wherein the image includes the identified object and at least one of:
    multiple layers, wherein different layers include different types of objects;
    the geographical image or map as a background; and
    data associated with the object in addition to the data converted to the number of primitives.

5. The method of claim 1, wherein:
    the number of primitives include at least one of a line, a polyline, a spline, an arc, an ellipse, and a polygon; and
    the geometrical shape to which the number of primitives are fitted is an ellipse, a rectangle, or an arc.

6. The method of claim 1, wherein the method includes identifying the object by looking up the geometrical shape in a pre-defined library, wherein the pre-defined library includes:
    a number of object identifiers;
    definitions for each object identifier; and
    a description of geometrical shapes corresponding to each object identifier.

7. The method of claim 1, wherein:
    the data associated with the object on the geographical image or map is an image of the object on the geographical image or map; and
    the image of the object includes a number of patterns, wherein the number of patterns include at least one of an arc for a door, two long parallel lines for a road, and a loop with long parallel lines for a pipe.

8. The method of claim 1, wherein the method includes, if the geometrical shape is a pipe-like geometrical shape:
    composing the number of primitives into a graph, wherein the graph includes a number of end points of the number of primitives and a number of edges between the number of end points;
    closing the graph at the number of end points;
    removing any open edges;
    partitioning the graph into a number of segments;
    locating the number of segments; and
    refining the number of segments.

9. The method of claim 8, wherein:
    composing the number of primitives into the graph includes merging all end points of the number of primitives that are within a pre-defined tolerance distance into a single end point;
    closing the graph at the number of end points includes adding an edge between any pair of end points that are open and have a distance therebetween that is less than the pre-defined tolerance distance;
    partitioning the graph into a number of segments includes adding an edge between any pair of end points that are both corners and have a distance therebetween that is less than the pre-defined tolerance distance; and
    refining the number of segments includes fitting the number of segments to a rectangle or chopped rectangle.

10. A computer implemented method for identifying an object, comprising:
   converting data associated with an object on a geographical image or map into a number of primitives;
   fitting the number of primitives to a geometrical shape;
   tracing and connecting the number of primitives to form a loop;
   detecting text in the number of primitives, wherein detecting text in the number of primitives includes deriving text from a number of line segments in the number of primitives; and
   identifying the object based, at least in part, on the geometrical shape to which the number of primitives is fitted, the formed loop, and the detected text.

11. The method of claim 10, wherein the method includes naming the object using the detected text.

12. The method of claim 11, wherein naming the object using the detected text includes:
   determining a boundary associated with the object;
   determining whether the detected text is inside the boundary associated with the object; and
   assigning the detected text to the object if the detected text is inside the boundary associated with the object.

13. The method of claim 12, wherein naming the object using the detected text includes:
   determining, if the detected text is not inside the boundary associated with the object, whether the detected text is within a pre-defined tolerance distance from the object; and
   assigning the detected text to the object if the detected text is within the pre-defined tolerance distance from the object.

14. The method of claim 13, wherein naming the object using the detected text includes:
   determining, if the detected text is not within the pre-defined tolerance distance from the object, whether the detected text and the object are linked by a line; and
   assigning the detected text to the object if the detected text and the object are linked by a line.

15. The method of claim 10, wherein the method includes identifying the object by looking up the name of the object in an object definition library having a number of object identifiers and definitions for each object identifier that include names corresponding to each object identifier.

16. A computer implemented method for identifying an object, comprising:
   converting data associated with an object on a geographical image or map into a number of primitives;
   fitting the number of primitives to a geometrical shape;
   identifying the object based, at least in part, on the geometrical shape to which the number of primitives is fitted; and
   if the geometrical shape is a pipe-like geometrical shape:
      composing the number of primitives into a graph, wherein the graph includes a number of end points of the number of primitives and a number of edges between the number of end points;
      closing the graph at the number of end points;
      removing any open edges;
      partitioning the graph into a number of segments;
      locating the number of segments; and
      refining the number of segments.

17. The method of claim 16, wherein the number of primitives include a number of open curves having a start point and an end point.

18. The method of claim 16, wherein the method includes tracing and connecting the number of primitives using at least one of directional tracing, right-most tracing, and left-most tracing.

19. The method of claim 16, wherein the method includes:
   tracing and connecting the number of primitives in a first direction from a start point; and
   tracing and connecting the number of primitives in a second direction from the start point, wherein the second direction is a reverse direction from the first direction.

* * * * *